May 28, 1963 R. D. BOUTROS ETAL 3,091,474
CHUCK FOR DRIVE SHAFTS
Filed Nov. 23, 1960 2 Sheets-Sheet 1
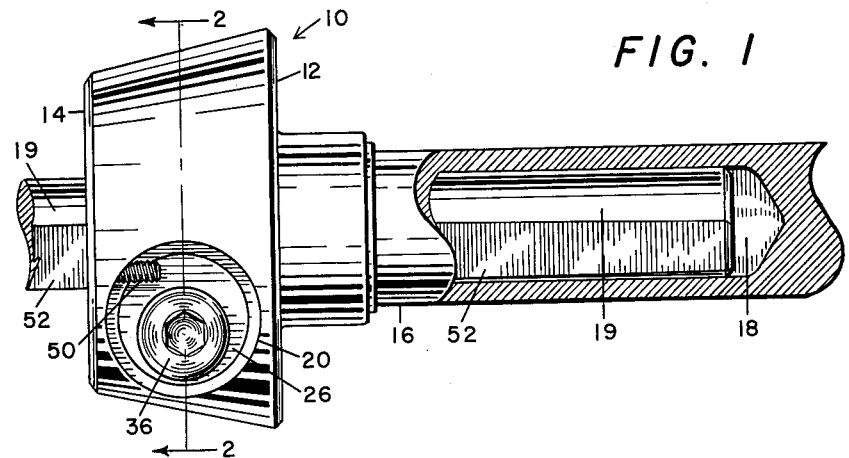
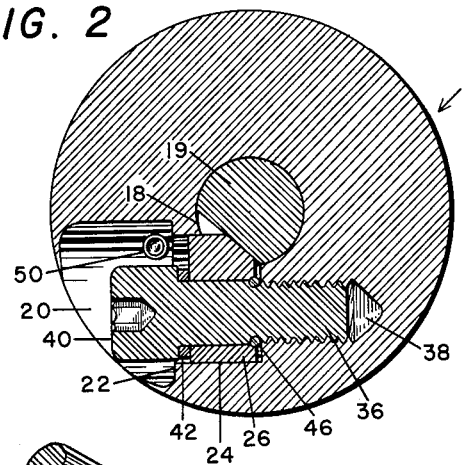
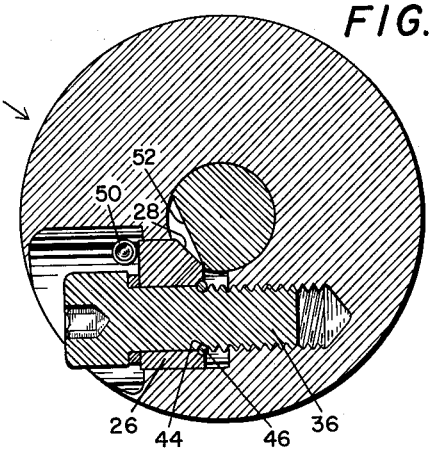
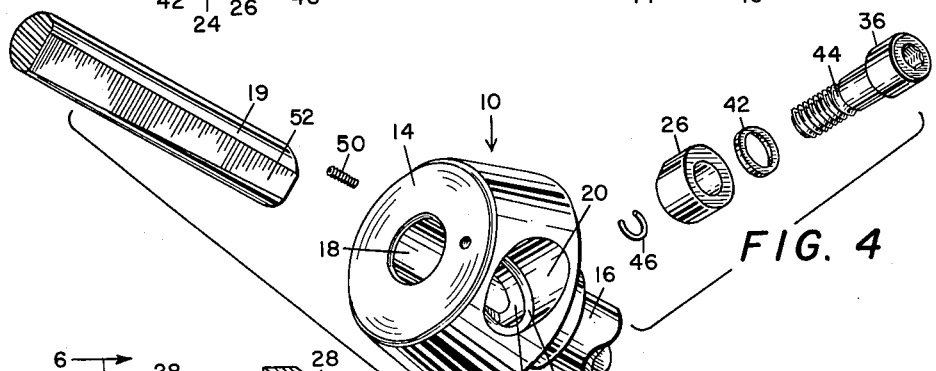
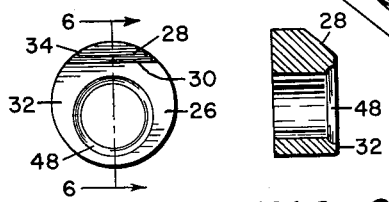
INVENTORS.
RICHARD D. BOUTROS
MILTON DYKMAN
BY
THEIR ATTORNEYS.

United States Patent Office 3,091,474
Patented May 28, 1963

3,091,474
CHUCK FOR DRIVE SHAFTS
Richard D. Boutros, Fairport, and Milton Dykman, Brighton, N.Y., assignors to Mixing Equipment Co., Inc., Rochester, N.Y., a corporation of New York
Filed Nov. 23, 1960, Ser. No. 71,328
8 Claims. (Cl. 279—97)

This invention relates to chucks for driving shafts, drills and like rotary parts, one object being to provide an improved chuck having a more simple, effective and convenient construction.

Another object is to make available a construction having relatively few parts and substantially free from parts projecting outwardly from cylindrical shape, so as to be more convenient and safe to handle and operate.

Another object is to provide a construction having the above advantages and capable of adaptation for use with driven shafts of circular, segmental or other like shapes in cross section.

Another object is to supply a construction by which the driven shaft or part can be inserted in the chuck only in proper relation to the gripping parts and is positively driven and reliably retained against inadvertently dropping out.

Still a further object is a chuck comprising relatively few parts of simple construction economical to manufacture and assemble and convenient in operation.

To these and other ends the invention resides in certain improvements and combinations of parts, all as will be hereinafter more fully described, the novel features being pointed out in the claims at the end of the specification.

Figure 7:
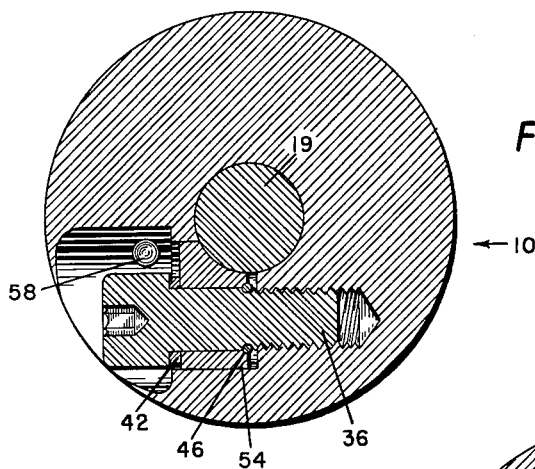
Figure 8:
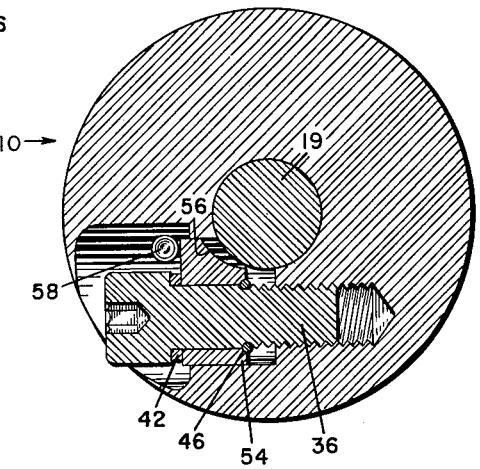
Figure 9:
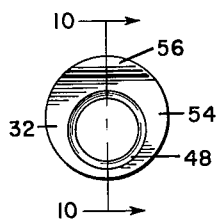
Figure 10:
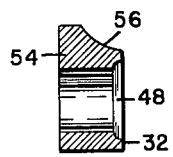

In the drawings:
FIG. 1 is a side elevation of a chuck embodying the present invention, partly in section and partly broken away;
FIG. 2 is a sectional view on the line 2—2 in FIG. 1, showing the parts in clamping position;
FIG. 3 is a view similar to FIG. 2 but showing the parts in position for unclamping the shaft 19;
FIG. 4 is an exploded perspective view of the several parts detached;
FIG. 5 is an end view of the clamping wedge;
FIG. 6 is a sectional view on the line 6—6 in FIG. 5;
FIG. 7 and 8 are views similar to FIGS. 2 and 3 but showing a modified construction, and
FIGS. 9 and 10 are views similar to FIGS. 5 and 6 but showing the modification of FIGS. 7 and 8.

The invention is embodied in the present instance, by way of example, in a chuck construction comprising a main body portion 10 having generally the shape of a truncated cone with a base 12 and an opposite end 14, of metal, or other suitable material. Extending concentrically and perpendicularly from the base 12, is a shank 16 for connection with a motor or other suitable means for rotating the chuck. Shank 16 is integral with the body portion in the present instance and is made hollow to provide a bore 18 extending through the other end 14 of the chuck body for the reception of a driven shaft, drill or other element to be gripped and rotated. As shown, the shaft end is compactly received mainly in the chuck shank.

The body portion 10 is formed with a cylindrical recess 20 extending transversely and eccentrically of its axis and to a substantial depth, as shown. Extending concentrically inwardly from the bottom 22 of the recess and intersecting the shaft bore 18 is a cylindrical opening 24 in which is slidably fitted a cylindrical wedge 26. Wedge 26 is preferably formed at one side of its inner end with a flat gripping surface 28 projecting into the shaft bore for gripping engagement with a shaft therein. This wedge surface is preferably in the shape of a segment of a circle with its chord 30 (FIG. 5) in the inner end 32 of the wedge and its arc 34 in the cylindrical side wall thereof, as shown, thus providing the wedge with a flat surface of substantial area for gripping engagement with the shaft.

A screw 36 is rotatably inserted through wedge 26 eccentrically of its axis and threadedly engaged in an opening 38 formed through the bottom of the wedge opening 24 in the main body portion 10. Since the wedge is fitted in its opening and screw 36 is fitted eccentrically in the wedge, the latter is held against rotation in its opening so as to maintain its flat surface uniformly projecting into the shaft bore.

The head 40 of screw 36 is arranged to press the wedge inwardly in its opening into engagement with the driven shaft as the screw is turned in its threaded opening. A lubricated washer 42 is preferably interposed between the head of the screw and the wedge to reduce friction and wear. Screw 36 is formed with a groove 44 adjacent the inner side of the wedge in which a snap or retainer ring 46 is inserted to bear against the wedge which at this portion is preferably undercut as at 48 (FIG. 6) to assist in retaining the ring in its groove. As the screw is turned and withdrawn, the ring slides the wedge outwardly away from engagement with the driven shaft. Means is provided, however, such as a pin or screw 50, to limit outward movement of the wedge to maintain its gripping surface projecting into the shaft bore for a purpose hereafter described. Screw 50 is mounted in a threaded opening in the end 14 of the body portion so as to project into recess 20 over the end of the wedge to limit its outward movement. Both clamping screw 36 and the screw 50 are conveniently formed with sockets, as shown, for turning by Allen wrenches of suitable size.

The chuck is adapted, as described above, for use in combination with a shaft 19 having an end of generally cylindrical shape closely fitting in bore 18 in the chuck body portion and its shank, but preferably formed with a flat surface 52 milled longitudinally on one side thereof from its end in the bore to at least the position of the wedge, this flat surface being tapered in depth to project progressively outward from the area of engagement of the wedge to the end of the shaft, so that in case of any inadvertent loosening of gripping engagement by the wedge, outward movement of the shaft tends to restore such engagement and also to prevent the shaft from dropping accidentally from the chuck.

It is apparent from the above description that the shaft 19 can be inserted in the chuck only with its flat surface 52 in position to engage the flat surface 28 of the wedge, since the wedge is held against rotation and with its flat surface projecting into the shaft bore by the limiting action of screw 50.

In use, screw 36 is turned to slightly withdraw the wedge in the shaft bore, the shaft end is inserted in registry with the wedge and screw 36 is turned to force the wedge into effective gripping contact with the shaft to lock it in engagement for rotation by the chuck. Retraction of screw 36 serves to release the shaft which is thus gripped and released by the simple and convenient expedient of rotating the screw.

The chuck is capable of adaptation for use with driven shafts of varying cross sectional shape, by adaptation of the shape of the gripping surface of the wedge to the shape of the driven shaft. Thus, instead of the flat gripping surface 28 described above for use with a flattened shaft surface 52, the wedge 54 may be formed, for example, with a gripping surface 56 of cylindrical shape, as shown in FIGS. 7–10, to conform to the surface of a driven shaft of full cylindrical shape. In this modification the stop screw 58 may be positioned outwardly, as shown, to permit retraction of the wedge from the bore for the driven shaft, or may be omitted altogether.

It is apparent also that the chuck has a self-contained construction by which it encloses the operating parts so that its substantially smooth cylindrical surfaces are maintained free from projections and thus rendered more convenient and safe to handle and operate.

It is further apparent that the construction comprises relatively few parts of relatively simple construction so as to be economical to manufacture and assemble and convenient in operation.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

We claim:
1. A chuck for drive shafts and the like comprising a body portion formed with a bore for reception of a driven shaft and a shank concentric with said bore for connection with driving means, said body portion having therein an opening extending transversely of and intersecting said driven shaft bore eccentrically of the axis thereof, a wedge in said opening and having a gripping surface projecting into said bore for gripping a shaft therein, and a screw extending rotatably through said wedge and threadedly engaged in said body portion with its head pressing said wedge into gripping engagement with said driven shaft.

2. A chuck as specified in claim 1 in which said screw is formed with a groove inwardly of said wedge and comprising a retainer ring in said groove for withdrawing said wedge from engagement with said shaft and stop means on said body portion for engagement with said wedge to maintain said surface thereof in said shaft bore.

3. A chuck as specified in claim 1 in which said body portion is formed with an inwardly extending recess with said wedge opening extending inwardly from the bottom of said recess and with said recess substantially enclosing said screw head.

4. A chuck as specified in claim 1 in which said body portion has the shape substantially of a truncated cone with said shank projecting from its base and said bore is formed mainly in said shank.

5. A chuck as specified in claim 1 in which said screw extends through said wedge eccentrically of the longitudinal axis thereof to retain said wedge against rotation in said opening.

6. A chuck as specified in claim 1 in which said wedge and wedge opening are cylindrical in shape and said wedge gripping surface is substantially cylindrical in shape to conform to and engage the surface of a cylindrical driven shaft.

7. A chuck as specified in claim 1 in which said wedge and wedge opening are cylindrical in shape and said wedge gripping surface is substantially a plane lying between a segment of the circular end of said wedge and the intersection of said plane with the cylindrical side wall of said wedge.

8. The combination with a chuck for drive shafts and the like comprising a body portion formed with a bore for reception of a driven shaft and a shank for connection with driving means, said body portion having therein an opening extending transversely of and intersecting said driven shaft bore eccentrically of the axis thereof, a wedge in said opening having a flat gripping surface projecting into said bore for gripping a shaft therein, a screw extending rotatably through said wedge and threadedly engaged in said body portion with its head pressing said wedge into gripping engagement with said driven shaft, of a driven shaft having on one side thereof a flat surface for positive engagement with said wedge surface extending longitudinally of said shaft from its end in said bore to the position of said wedge surface and tapered to project progressively outward from the position of said wedge surface to the end of said shaft to maintain engagement between said shaft and wedge on outward movement of said shaft in said bore.

References Cited in the file of this patent

UNITED STATES PATENTS

| | | |
|---|---|---|
| 963,559 | Hines | July 5, 1910 |
| 1,062,651 | Hultquist | May 27, 1913 |
| 2,257,169 | Hopps | Sept. 30, 1941 |